(12) United States Patent
Khami et al.

(10) Patent No.: US 8,568,502 B2
(45) Date of Patent: Oct. 29, 2013

(54) SPRING CLAMP FOR AN AIR FILTER HOUSING

(75) Inventors: Roger Khami, Troy, MI (US); Leon Speed, Bloomfield Hills, MI (US); Scott M. Rollins, Canton, MI (US); Erik Hermann, Ann Arbor, MI (US); Ha To Chung, Canton, MI (US); John Qingrui Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 12/871,200

(22) Filed: Aug. 30, 2010

(65) Prior Publication Data

US 2012/0047856 A1  Mar. 1, 2012

(51) Int. Cl.
*B01D 46/00* (2006.01)

(52) U.S. Cl.
USPC .............................. 55/385.3; 55/493; 55/503

(58) Field of Classification Search
USPC ........ 55/493, 498, 502, 503, 521, 490, 385.3, 55/511, DIG. 28; 123/198 E; 403/364, 403/374.1, 374.5; 210/232, 238; 264/328.1, 264/328.8
See application file for complete search history.

(56) References Cited

U.S. PATENT DOCUMENTS

| | | | |
|---|---|---|---|
| 4,881,292 A | 11/1989 | Hoferer et al. | |
| 4,925,469 A * | 5/1990 | Clement et al. | 55/480 |
| 5,545,241 A * | 8/1996 | Vanderauwera et al. | 55/490 |
| 5,554,205 A | 9/1996 | Ernst et al. | |
| 5,569,311 A * | 10/1996 | Oda et al. | 55/493 |
| 5,605,554 A * | 2/1997 | Kennedy | 55/493 |
| 5,730,768 A * | 3/1998 | Kaminaga et al. | 55/385.3 |
| 6,174,343 B1 * | 1/2001 | Bloomer | 55/385.3 |
| 6,231,630 B1 | 5/2001 | Ernst et al. | |
| 6,375,700 B1 * | 4/2002 | Jaroszczyk et al. | 55/498 |
| 7,674,308 B2 * | 3/2010 | Krisko et al. | 55/502 |
| 8,167,968 B2 * | 5/2012 | Sato et al. | 55/385.3 |
| 2006/0025256 A1 | 2/2006 | Wake | |
| 2009/0056124 A1 | 3/2009 | Krebs et al. | |
| 2010/0024371 A1 * | 2/2010 | Rieger | 55/498 |
| 2010/0043367 A1 | 2/2010 | Desjardins | |
| 2010/0139225 A1 * | 6/2010 | Mammarella et al. | 55/493 |

FOREIGN PATENT DOCUMENTS

FR  2751921 A1  2/1998

* cited by examiner

*Primary Examiner* — Duane Smith
*Assistant Examiner* — Minh-Chau Pham
(74) *Attorney, Agent, or Firm* — Julia Voutyras; Alleman Hall McCoy Russell & Tuttle LLP

(57) ABSTRACT

A spring clamp for providing a compressive load to a compression seal in an air filtration system for a vehicle. The spring clamp may be made of a plastic composite and includes an arch-like arm wherein elastic deformation is distributed throughout the arch while providing a compressive load. The spring clamp may include a head piece with a greater thickness than the other parts of the spring clamp to provide greater material strength at a point of contact between the spring clamp and an air filter housing.

22 Claims, 2 Drawing Sheets

SPRING CLAMP FOR AN AIR FILTER HOUSING

FIELD

The present application relates to a spring clamp for providing a compressive load to a compression seal in an air filtration system for a vehicle.

BACKGROUND AND SUMMARY

Air filters for vehicles typically comprise an upper casing, a lower casing, a fibrous material, and a compressible seal encompassing the fibrous material. The seal is disposed between the perimeters of the upper and lower casings in a region where the upper and lower casings are mated. The seal requires a continuous compressive load to ensure no gaps develop over time and allow unfiltered air, containing particulate matter, to bypass the filter and continue into the engine intake. The compressive load, however, must be limited to prevent over compression of the seal material resulting in seal damage, such as tearing.

In one approach, described in US Patent Application Publication 2010/0043367 A1, compression of a seal between an upper casing and a lower casing is accomplished by a pivotable spring clamp. One end of the spring clamp is rotatably mounted to the lower portion of the casing by a cylindrical attachment portion encompassing a rotational axis, together forming a hinge. A flat-surfaced head piece on an opposing end of the spring clamp may be engaged and disengaged with a flange on the perimeter of the upper casing, thereby compressing the seal between the perimeters of the two casings. In the engaged state, the spring clamp is elastically deformed at a joint in an arm portion of the clip to provide a compressive load on the filter casings and the seal. The spring clamp is moved from the disengaged position to the engaged position by a applying a force to a lever located in the joint region of the arm.

The inventors herein recognize potential issues with such a spring clamp. As one example, in the previously described spring clamp the majority of elastic deformation is absorbed in a relatively small region of the spring clip, located around the joint. As the lever is also located at the joint, force is additionally applied directly to the joint while moving the spring lever into the engaged position. Over time, the joint may become permanently deformed or break. Deformation or breakage of the spring clamp may eliminate the compressive load provided to the casings and the seal is decreased. If the compressive load is insufficient, unfiltered air will enter through the seal and particulate matter may enter engine cylinders, causing mechanical wear and oil contamination.

In another example, if the previously described spring clamp is damaged, replacement is difficult as the cylindrical attachment portion of the spring clamp encompasses the rotational axis on the lower casing. In yet another example, engagement of the spring clamp may be difficult as the head portion has a flat surface and the operational force is exerted a substantially central region of the clamp (the lever being located at the joint).

Thus, some of the above issues may be at least partly addressed by an air filtration system for a vehicle, comprising: a first filter casing; a second filter casing mating with the first filter casing via a compressible seal to form a cavity therebetween; a filter disposed in the cavity; and at least one spring clamp including an arm, the arm including a continuously curving arc from an attachment portion to a head piece to absorb elastic deformation while maintaining coupling of the first filter casing and second filter casing, wherein the head piece has a first thickness and the continuously curving arc has a second thickness, the first thickness greater than the second thickness.

In this example, elastic deformation of the clamp is distributed over the length of the arm. The spring clamp may also include a hook attachment portion which may be reversibly attached to a rotational axis on the filter casing, allowing a damaged spring clamp to be easily replaced. Additionally, the head piece may include a rounded or chamfered edge and the lever may be located on the head piece. Both of these features may allow the spring clip to move into the engaged position with less applied force. The thickness of the head piece may be greater than the thickness of the arm portion, the attachment portion, and the lever. The greater thickness of the head piece may provide greater material strength in the region of the spring clip which contacts the upper casing and directly applies a downward force on the upper casing in the engaged position.

In one specific example, a spring clamp is comprised of plastic composite and includes an arc-like arm portion with a first thickness. One end of the spring clamp includes a hook-shaped attachment portion which is reversibly mounted to a rotational axis on a lower casing for a filter. The opposing end of the spring clip includes a head piece with a rounded edge and an upward-projecting lever. The head piece has a second thickness, which is greater than the first thickness. A force may be applied to the lever to slide the rounded edge over a flange on a perimeter of an upper filter casing. As such, the spring clamp may be selectively moved between an engaged position and a disengaged position. In the engaged position, elastic deformation of the spring clamp is distributed over the length of the arc-like arm portion while the head piece contacts the upper filter casing to provide a downward force and the attachment portion provides an upward force on the rotational axis of the lower casing. Combined these features provide a compressive load to the casing and the seal. In this manner, the seal material is compressed and air containing particulate matter will be cleaned as it passes through the filter and into the engine intake. Should the spring clamp undergo damage, the hook may be disengaged from the rotational axis and a new spring clamp may easily installed the damaged spring clamp. Additionally, as the spring clamp is comprised of plastic, it may be colored for easy identification, it may include molded ergonomic features on the lever, and it may be manufactured in a one step procedure. The manufacturing process for plastic composite spring clamps may be advantageous over the multi-step manufacturing procedure required for fabricating metallic spring clamps, which may include post-fabricating steps such as de-burring, heat treating, and corrosion resistant plating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
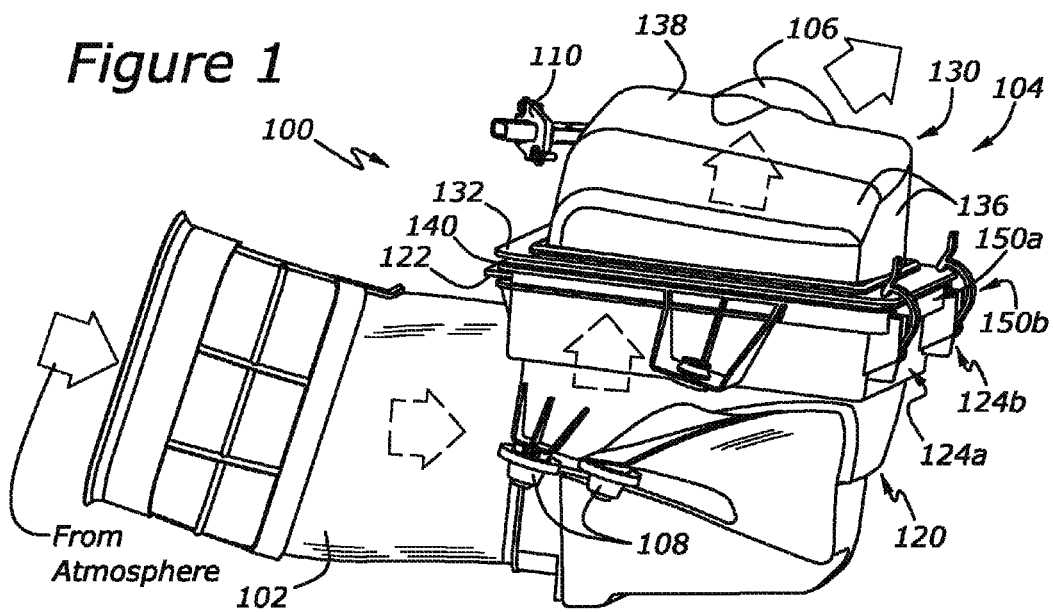
FIG. 1 includes an example embodiment of an air filtration system for a vehicle including a spring clamp.

The following description relates to an air filtration system for a vehicle, such as a passenger vehicle, configured to receive air from the atmosphere, filter particulate matter from the air, and deliver the filtered air to an engine intake. The air filtration system may include an air intake in communication with the atmosphere, a throttle which regulates air flow through the air intake, a filter housing comprising a least two portions (a first portion coupled to the atmospheric air intake and a second portion of filter housing coupled to a filtered air outlet), a filter disposed within the filter housing, a seal substantially encompassing the filter and compressed between the at least two portions of the filter housing, at least one spring clamp to provide a compressive load to the seal, and a filtered air outlet coupling the filter housing to an internal combustion engine. An example embodiment of such an air filtration system is shown in FIG. 1.

In this embodiment, the filter housing includes two portions, a first filter casing and a second filter casing. The first and second filter casings may be mated at a perimeter edge of each casing. The perimeters may each include a flange which extends axially from the filter housing. The filter may be sealed at its perimeter between the perimeters of the first filter casing and the second filter casing. The first filter casing may be coupled to the atmospheric air intake and is therefore on the unfiltered air side of the filter. The second filter casing may be coupled to the air outlet for providing air to the engine and is therefore on the filtered air side of the filter. The amount of air flow through the filter system to the engine may be regulated by opening and closing of the throttle, which may be disposed in the pathway of the unfiltered air intake.

The filter may be sealed between the two filter casings in order to prevent leakage of unfiltered air to the engine. The seal encompasses the filter and may be comprised of a compressible material. A compressive load may be provided to the seal via at least one spring clamp. Spring clamps are comprised of plastic composite material, however, in alternate embodiments spring clamps may be fabricated from any desired elastic material. The at least one spring clamp includes a hook-shaped attachment portion which may be reversibly mounted to a rotational axis on the first filter casing, a head piece which may abut the flange on the perimeter of the second filter casing in an engaged position, a lever extending from the head piece, and an arm portion comprising an arc between the attachment portion and the head piece.

Figure 2:
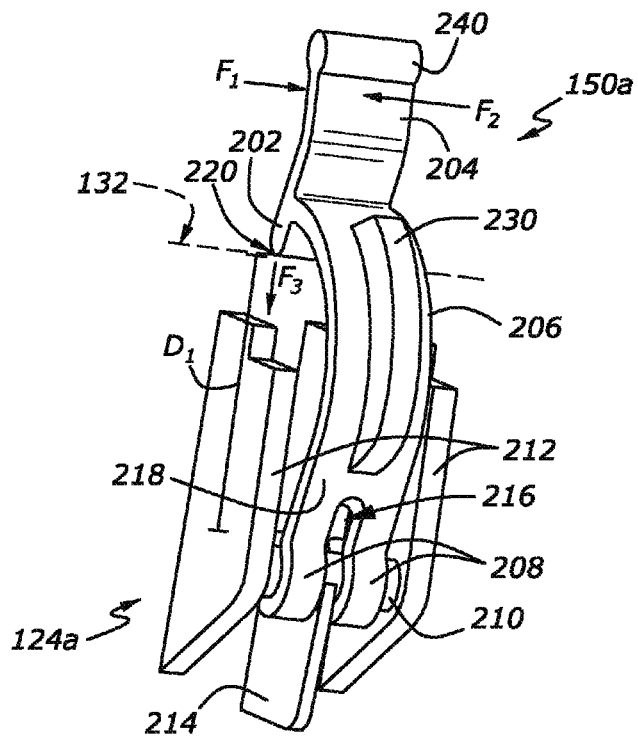
FIG. 2 includes the spring clamp of the air filtration system of FIG. 1 rotatably mounted to a rotational axis.

An example embodiment of a spring clamp mounted to a rotational axis of a first filter casing is shown in FIG. 2. The spring clamp is shown in the engaged position, wherein a compressive load is provided to the seal. The spring clamp may be moved to a disengaged position, wherein the seal is released, by applying a force to the lever in an outward direction relative to the filter housing. In the disengaged position, the second filter casing may be removed and the filter may be inspected and/or replaced by an operator.

Figure 3A:
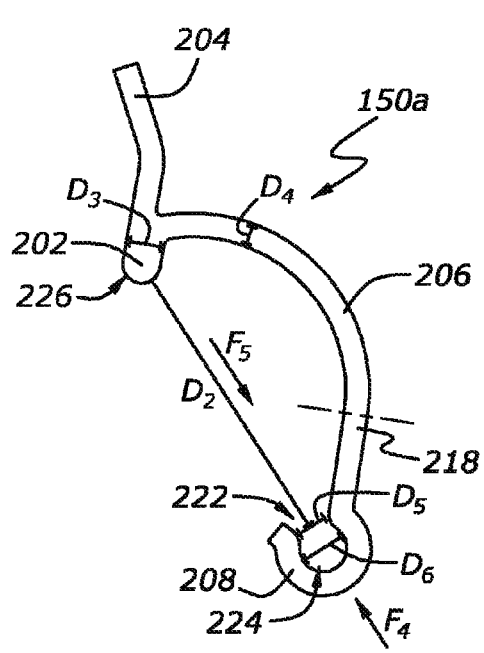
FIGS. 3a-3c include an orthographic projection of the example spring clamp of FIGS. 1 and 2, the spring clamp approximately to scale.
Figure 3B:
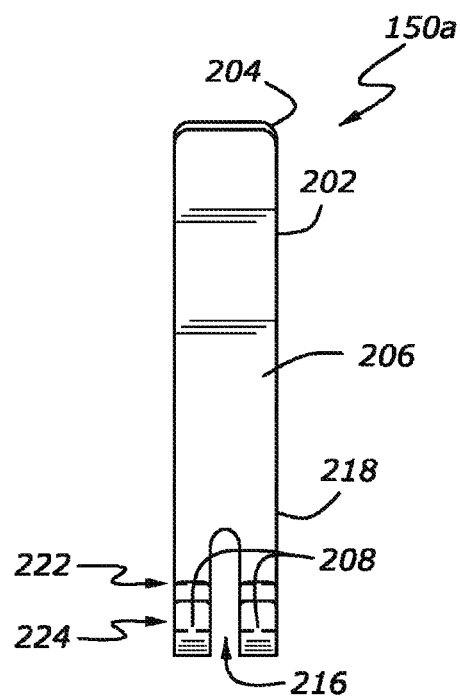
Figure 3C:
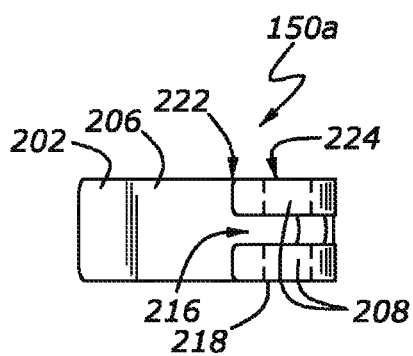
Figure 3D:
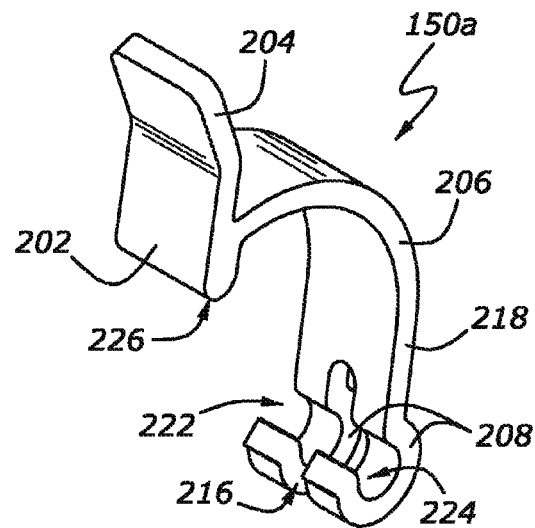
FIG. 3d includes an isometric view of the example spring clamp of FIGS. 1 and 2, the spring clamp approximately to scale.

An orthographic projection of the example spring clamp is shown in FIGS. 3a-3c and an isometric view of the spring clamp is shown in FIG. 3d. The profile view of the spring clamp in FIG. 3a shows the attachment portion, the arm, the head piece, and the lever, as well as the relative thicknesses of each. The arm projects straight from the attachment portion (stem of the hook) and then comprises a continuously curving arc connecting to the head piece. In alternate embodiments, the arm may comprise a continuously curving arc from the hook to the head piece. The lever extends from the head piece in a substantially longitudinal direction relative to the main body of the clamp (the head piece, arm portion, and attachment portion). In this example embodiment, the head piece may have a rounded edge and a greater thickness than the other portions of the spring clamp.

Such a conformation for a spring clamp may be advantageous in that the durability of the spring clamp may be increased and it may be more easily operated. Increased durability may be achieved with this conformation, for example, because elastic deformation of the spring clamp is distributed over the length of the arm portion in the engaged position. During engagement of the spring clamp, relatively little force is applied to the arm portion and this may contribute to an overall increase in durability. Further, the location and orientation of the lever may allow for the spring clamp to be easily operated. The rounded edge of the head piece also contributes to ease of operation, as it may be easily slid over the flange of the second filter casing. The head piece may have greater material strength and less flexibility than the other parts of the clamp, as the head piece has a greater thickness. This may also contribute to durability of the spring clamp as the head piece directly contacts and applies a downward force on the flange of the second casing. In some embodiments, the spring clamp material strength of the spring clamp may be further increased by a strengthening rib centrally disposed on an outer wall of the arm. Engineering analysis may be used to determine wall thickness ratios for each portion of a spring clamp.

Other advantages may include easy installation and/or replacement of the spring clamp if the spring clamp is damaged. For example, the hook shape of the attachment portion may allow easy removal from the rotational axis by applying a downward force on a disengaged damaged spring clamp. A new spring clamp may then be added to the filter housing by applying an upward force to mount the hook portion on the rotational axis. Additionally, as the spring clamp is comprised of plastic composite, it may be fabricated in a bright color, such as Service or Safety yellow, so that it may be easily identified during servicing of the vehicle.

FIG. 1 shows an air filtration system 100 for a vehicle including a combustion engine. The direction of air flow is represented by outlined arrows. Solid arrows indicate air flow external of air filtration system 100, while dashed arrows indicate air flow within air filtration system 100. A throttle (not shown) may be disposed in the air flow path upstream of the air intake duct 102. Opening of the throttle may increase air flow, while closing of the throttle may decrease air flow. Unfiltered air may flow from air intake duct 102, through filter housing 104, wherein particulate matter is filtered from the air by a filter (not show). Filtered air may then be directed to the engine via air outlet duct 106. In one example, air intake duct 102 is directly open to the atmosphere at the location of the throttle. In another example, unfiltered air intake duct 102 may be coupled to the atmosphere via additional pipe or hose line and the throttle body and/or intake manifold are disposed in the additional pipe or hose line. Similarly, filtered air outlet duct 106 may be directly coupled to the engine intake manifold (not shown) or, in an alternate embodiment, may be indirectly coupled via additional pipe or hose line (not shown).

Filter housing 104 is coupled to air intake duct 102 by mounting features 108. In the present example three mounting features are shown on a first side of vehicle air filtration system 100. It may be appreciated that vehicle air filtration system 100 may include more or less mounting features on the first side. Likewise, a second side, opposing the first side, may include additional mounting features (not shown). The additional mounting features may be symmetrical or asymmetrical relative to mounting features 108. Mounting features 108 may be further coupled to the vehicle body (not shown) or to other vehicle parts via brackets in order to stabilize the position of the filter system within the vehicle.

Filter housing 104 includes a first filter casing 120 abutted against a second filter casing 130. Each of first filter casing 120 and second filter casing 130 are generally cube-shaped, however in alternate embodiments other shapes of filter casing may be possible without departing from the scope of this application. First filter casing 120 and second filter casing 130 may be mated to form an internal cavity of filter housing 104. A filter (not shown) may be disposed within the cavity between the two casings, substantially dividing the cavity into two smaller cavities. A first cavity may be located within the first filter casing 120 and may be considered a "dirty" side of the filter as it contains unfiltered air. A second cavity may be located within the second filter casing 130 and may be considered a "clean" side of the filter as it contains filtered air.

The filter may be comprised of fibrous material, such as foam, paper, spun fiber glass, or a synthetic filter media. After a predetermined duration of use, the filter may become sufficiently full of debris or other particulates and may be replaced.

Mass air flow (MAF) sensor 110 may be operatively coupled to upper filter casing 130. MAF sensor 110 may be used to determine the mass of air entering the engine. A signal may be sent from MAF sensor 110 to the engine control unit (ECU) (not shown). The ECU may then regulate opening and closing of the throttle, for example, in order to regulate the amount of air flowing to the engine. MAF sensor 110 may be either of a vane meter, a hot wire, or another type of mass air flow sensor.

In the example embodiment of FIG. 1, first filter casing 120 has four walls 136 (only two are shown in FIG. 1) defining four sides of the general cube shape. A cross section of walls 126 may be generally square-shaped. Four walls 136 are perpendicular to air intake duct 102. A first open side of lower filter casing 120 (not shown) may not include a wall and may be substantially open to air intake duct 102 so that unfiltered air may pass from air intake duct 102 to filter housing 104. In alternate embodiments, the first filter housing may include a wall in this region. In this example, the first filter casing may include a wall that is perpendicular to four walls 136 and axial relative to the air intake duct 102. The air intake duct 102 may then be coupled to one of walls 136 so that unfiltered air may flow into filter housing 104.

In the example embodiment of FIG. 1, first filter casing 120 is substantially open/lacking a wall on a second open side, which opposes the first open side. The second open side of first filter casing 120 may be defined by a perimeter which includes a first flange 122. First flange 122 extends outward from the internal cavity of lower filter casing 120 and is perpendicular to walls 136. First flange 122 may be mated with a second flange 132 on the perimeter of second filter casing 130.

In this embodiment, second flange 132 extends outward from the internal cavity of second filter casing 130 and defines a perimeter of second filter casing 130. In order for second filter casing 130 to form an internal cavity of filter housing 104 in combination with first filter casing 120, second filter casing 130 may include and third open side, which is open/ lacks a wall and is encompassed by second flange 132. Second flange 132 is substantially perpendicular relative to four walls 136 (only two are shown in FIG. 1). Walls 136 define four sides of the general cube shape of second filter casing 130. A cross section of walls 136 may be generally square-shaped. Air outlet duct 106 is coupled to second filter casing 130 via an opening in one of walls 136. Wall 138 defines a side opposing the third open side and is substantially perpendicular to walls 136.

Compressible seal 140 is disposed between first flange 122 and second flange 132. Compressible seal 140 may substantially encompass the filter disposed between lower filter casing 120 and upper filter casing 130. Compressible seal 140 may be comprised of a compressible material such as elastomer, urethane, or felt or may simply be a formed area of the filter material in the case of a synthetic filter media.

In order to provide a compressive load to compressible seal 140, a force may be applied to each of the first filter casing 120 and the second filter casing 130 such that the seal is compressed between first flange 122 and second flange 132. In the present example, two spring clamps 150a and 150b are provided and are rotatably coupled to first filter casing 120 at mounting features 124a and 124b. In alternate embodiments, more or fewer spring clamps may be provided and/or spring clamps may be rotatably coupled to the second filter casing.

Spring clamps 150a and 150b may be selectively rotated between an engaged position and a disengaged position. Spring clamp 150a is further depicted in FIGS. 2 and 3a-d, and has the same general structure as spring clamp 150b. It may be appreciated that in alternate embodiments, filter housing 104 may include a combination of spring clamp designs. In FIG. 1, spring clamps 150a and 150b are shown in the engaged position, wherein a head piece 202 has been rotated over second flange 132 (shown in FIG. 2) and is abutted against a surface of second flange 132. A lever 204 extends from a head piece 202 and an operator may apply a force F1 to the lever in order to rotate spring clamp 150a into the disengaged position. An opposing force F2, may be used to return spring clamp 150a to the engaged position. The lever 204 may optionally include a gripper bead 240. The gripper bead 240 may provide an ergonomic improvement, which allows the lever to be more easily manipulated by an operator.

Spring clamp 150a is shown mounted to a rotational axis 210 of mounting feature 124a. Mounting feature 124a is located on the exterior of one of walls 126 of first filter casing 120. Rotational axis 210 is attached between two parallel supporting members 212. A central fin 214 is disposed between and parallel to supporting members 212. Central fin 214 is connected to a central region of rotational axis 210. Central fin 214 may provide additional strength and support to rotational axis 210. In an alternate embodiment, additional fins may provide support to the rotational axis or the central fin may be excluded. In another alternate embodiment, the rotational axis may be molded with an open and undercut cleat mold on the first filter casing.

Attachment portion 208 is rotatably mounted to rotational axis 210. Attachment portion 208 includes a central gap 216. Central gap 216 accommodates central fin 214. In an alternate embodiment wherein more fins are provided, the attachment portion may include additional gaps to accommodate each fin. Further, in an embodiment wherein no central fin is provided, the central gap may be excluded.

Second flange 132 is represented by a dashed line in FIG. 2. Line of contact 220 (shown as a single point in the 2-D figures) between head piece 202 and second flange 132 is also shown in FIG. 2. At line of contact 220, head piece 202 may be abutted to and pressed into second flange 132. This abutment may be maintained in the engaged position because of a force F3, which pushes head piece 202 into second flange 132. Force F3 may be provided by elastic deformation of arm 206.

In further detail, the distance between line of contact 220 and a rotational axis 210 has a distance D1. The distance between head piece 202 and an attachment portion 208 when spring clamp 150a is in the disengaged position has a distance D2 (shown in FIG. 3a). D2 is less than D1. In the engaged position, arm 206 may be stretched/elastically deformed to increase the distance between head piece 202 and attachment portion 208. Additionally, compressible seal 140 may be compacted after application of the compressive load to decrease the distance between line of contact 220 and the rotational axis 210. Thus, in the engaged position D1 is substantially equal to D2.

In the disengaged position arm 206 has a first curvature. In the engaged position arm 206 has a second curvature, which may be less than the first curvature. Elastic deformation of arm 206 provides force F3 and maintains air tight compression of compressible seal 140. Thus, air traveling through the air intake duct 102 and first filter casing 120 may be forced through the filter into second filter casing 130 and air outlet duct 106 and cannot escape through the mated region of first flange 122 and second flange 132.

A profile view of spring clamp 150a is provided in FIG. 3a. Herein, arm 206 comprises a continuously curving arch beginning from head piece 202 and continuing all the way to a stem 218 of attachment portion 208. The arched configuration of arm 206 may be advantageous in that elastic deformation may be equally distributed over the arch, rather than at a localized region of the arm. The arm 206 may optionally include a strengthening rib 230, centrally disposed on an outer curvature of the arm. The strengthening rib 230 may provide additional material strength to the spring clamp.

Also shown in FIG. 3a, head piece 202 has a thickness with a distance D3. Other parts of spring clamp 150a (arm 206, attachment portion 208, stem 218, and lever 204) have a thickness with a distance D4. D3 is greater than D4, and therefore the head piece may have greater material strength and rigidity than other parts of spring clamp 150a. In the preferred embodiment, D3 is approximately two times D4. However, in alternate embodiments, D3 may be greater than or less than two times D4.

As the head piece directly applies a force to the second flange at a line of contact 220, a greater material strength of the head piece may be advantageous. These features may increase overall durability and lifespan of the spring clamp. It may be appreciated that in alternate embodiments, it is not necessary to combine these features. In alternate examples, a spring clamp may include one or the other of an arched arm or a wider head piece and still have the advantage of increased durability and lifespan. Further, the lever may have increased thickness, such that the thickness of the lever is substantially equal to that of the head piece.

Another advantage of the embodiment of FIGS. 3a and 3d is the rounded edge 226 of head piece 202. Rounded edge 226 is the region of head piece 202 that participates in line of contact 220 (only a single contact point is shown in the 2-D figures) and directly contacts second flange 132. Because of the round shape of rounded edge 226, head piece 202 may be more easily slid over second flange 132 when being moved between the engaged position and the disengaged position.

The proposed spring clamp may have even another advantage in that it may be easily replaced if damaged or broken. As depicted in FIGS. 3a and 3d, attachment portion 208 is generally hook-shaped. Attachment portion 208 includes a gap 222 having a distance D5. Attachment portion 208 also includes a generally circular space 224 with a diameter having a distance D6. D6 may be substantially equal to a diameter of the rotational axis 210. D5 is less than D6, and therefore the distance of gap 222 may be less than the diameter of the rotational axis.

Attachment portion 208 may be mounted to rotational axis 210 by applying a force F4 great enough to cause the hook to flex and gap 222 may expand such that D5 become substantially equal to D6. With continued application of force F4, gap 222 may close around rotational axis 210 and D5 may return to its original distance. Rotational axis 210 may substantially fill generally circular space 224. As a result, spring clamp 150a may be mounted to rotational axis 210 and rotatable around rotational axis 210. Therefore, spring clamp 150a may be moved from the disengaged position to the engaged position.

If damaged, spring clamp 150a may be advantageously removed from rotational axis 210 by applying opposite force F5 when spring clamp 150a is in the disengaged position. In addition, spring clamp 150a may be easily installed. In alternate embodiments, the attachment portion may include an orifice through which a pin may be fitted by either of integral molding or insertion after molding of the spring clamp. In additional alternate embodiments, the hook portion of the spring clamp may be integrally molded with a pin. In this embodiment the pin may be later fitted to the lower filter housing. In these alternate embodiments, the pin is the rotational axis.

Spring clamp 150a is comprised of plastic composite material. The spring clamp may be comprised of one or more of nylon 66, PBT, acetel, polypylene, PET, PPS, and/or other suitable resin or composite material. The composite material may additionally include a filler, such as 10-40% glass fiber filler. As such the spring clamp may be easily molded and inexpensive to manufacture. Further, the spring clamp does not require bending, de-burring, heat treatment, or anti-corrosion plating, as may be required in the manufacturing of metallic spring clamps. Furthermore, in some embodiments, ergonomic features may be easily molded into the spring clamp, such as a continuous bead on the lever which may prevent an operator's fingers from slipping off the lever while moving the spring clamp between the engaged position and the disengaged position.

The plastic composite material may have coloration, such as Service or Safetly yellow or orange. In this example, where the spring clamp is brightly colored, an operator may quickly identify the location of the spring clamp within the vehicle and increase speed of servicing. A service manual may be provided with the vehicle and may include, in part, instructions for identifying coloration of spring clamps and instructions for operating spring clamps. In alternate embodiments, the plastic composite material may be other colors, such as black.

The above description characterizes a spring clamp for an air filtration system of a vehicle. The spring clamp may have the advantages of increased durability and lifespan over previously described spring clamps. The spring clamp may be easily replaced if damaged and may be easily operated by a user. Additionally, the spring clamp may be colored to contribute to either of identification of the spring clamp or underhood appearance.

It will be appreciated that the configurations disclosed herein are exemplary in nature, and that these specific embodiments are not to be considered in a limiting sense, because numerous variations are possible. For example, the above technology can be applied to various types of vehicles, such as cars or trucks. In another example, the technology can be applied to hybrid vehicle or a combustion engine only vehicle. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air filtration system for a vehicle, comprising:
    a first filter casing with a first flange mating with a second filter casing with a second flange via a compressible seal to enclose a filter therebetween; and
    a spring clamp including a continuously curving arc from an attachment portion of the spring clamp to a head piece of the spring clamp, the head piece contacting the second flange of the second filter casing, the head piece having a first material thickness, in a direction perpendicular to a filter casing wall, greater than a second material thickness of the continuously curving arc.

2. The air filtration system of claim 1, wherein the spring clamp is comprised of a plastic composite material, including nylon 66 with 30% glass fiber filler.

3. The air filtration system of claim 2, wherein the spring clamp includes a lever;
    and wherein the plastic composite material is yellow and the lever is yellow, the air filtration system coupled in an engine compartment of a vehicle, the engine compartment including a plurality of other manually adjustable levers for exposing or releasing service items, the plurality of other manually adjustable levers also colored yellow.

4. The air filtration system of claim 3, wherein the vehicle includes instructive materials in a service manual, the service manual including human readable instructions for identifying the lever based on coloration and operating the lever.

5. The air filtration system of claim 1, wherein a first perimeter of the first filter casing is mated to a second perimeter of the second filter casing, the first perimeter having the first flange and the second perimeter having the second flange, the compressible seal disposed between the first flange and the second flange, the compressible seal comprising a compressible material and substantially encompassing an outer edge of the filter; and
    wherein the spring clamp includes the head piece at a first end, the head piece being selectively moved between an engaged position and a disengaged position by sliding over the second flange while the attachment portion rotates around a rotational axis on a mounting feature on an outer surface of the first filter casing.

6. The air filtration system of claim 5, wherein the head piece is abutted against the second flange in the engaged position, and is not abutted against the second flange in the disengaged position.

7. The air filtration system of claim 5, wherein the head piece includes a rounded edge or a chamfered edge, which contacts the second flange during sliding between the engaged position and the disengaged position.

8. The air filtration system of claim 5, wherein the first material thickness is approximately two times the second material thickness.

9. The air filtration system of claim 8, wherein a lever is extended vertically from the head piece and wherein a force perpendicular to a lever face is applied to the lever to rotate the spring clamp between the engaged position and the disengaged position, and the lever includes a gripper bead at an end of the lever opposing the head piece.

10. The air filtration system of claim 9, wherein the lever has a third material thickness, the third material thickness substantially equal to the second material thickness.

11. The air filtration system of claim 5, wherein the attachment portion includes a hook and a stem at a second end of the spring clamp, the second end opposing the first end, and the hook reversibly coupled to the rotational axis.

12. The air filtration system of claim 11, wherein the hook substantially encompasses the rotational axis except at a gap portion of the hook.

13. The air filtration system of claim 12, wherein an internal wall of the hook forms a generally circular space, and a diameter of the generally circular space is substantially equivalent to a diameter of the rotational axis.

14. The air filtration system of claim 13, wherein the gap portion has a distance that is less than the diameter of the rotational axis, and the hook is be reversibly mounted to the rotational axis by forcing the rotational axis through the gap portion.

15. The air filtration system of claim 11, wherein the hook and the stem have a fourth material thickness, the fourth material thickness substantially equal to the second material thickness.

16. The air filtration system of claim 5, wherein an arm has a first curvature between the head piece and the attachment portion in the disengaged position, and the arm is not elastically deformed in the disengaged position.

17. The air filtration system of claim 16, wherein the arm has a second curvature between the head piece and the attachment portion in the engaged position, the second curvature less than the first curvature, and the arm elastically deformed in the engaged position.

18. The air filtration system of claim 1, wherein the arm includes a strengthening rib centrally disposed on an outer wall of the arm.

19. An air filtration system for a vehicle including a first filter casing with a first flange, the first flange mating with a second flange of a second filter casing via a compressible seal to enclose a filter between the first filter casing and the second filter casing, and a plastic spring clamp to provide a compressive load to the compressible seal, the plastic spring clamp rotatably attached to a rotational axis on the first filter casing and rotatable between an engaged position and a disengaged position, the plastic spring clamp comprising:
    an attachment portion at a first end of the plastic spring clamp reversibly attached to the rotational axis, the attachment portion comprising a stem and a hook, the hook including a generally circular space and a gap, the generally circular space having a first diameter, the first diameter substantially equal to a second diameter of the rotational axis, the gap having a third distance, the third distance less than the first diameter;
    a head piece at a second end of the plastic spring clamp, the second end opposing the first end, the head piece contacting the second flange at a line of contact in the engaged position and not contacting the second flange in the disengaged position, the head piece further including a rounded edge at the line of contact, the rounded edge slidable over the second flange, the head piece having a first material thickness;

a lever, which is extended vertically from the head piece, the lever capable of receiving a force in a first direction to move the plastic spring clamp to the engaged position and capable of receiving a force in a second direction to move the plastic spring clamp to the disengaged position, the first direction opposite of the second direction, the lever having a second material thickness, the first material thickness approximately two times the second thickness; and an arm, the arm comprising a continuously curving arc from the head piece to the stem of the attachment portion, the continuously curving arc having a first curvature in the disengaged position and a second curvature in the engaged position, the first curvature greater than the second curvature, the arm having the second material thickness.

20. A mechanism for compression of an air filter seal, comprising:

a first generally cube-shaped filter casing with a first perimeter having a first flange;

a second generally cube-shaped filter casing with a second perimeter having a second flange, the first perimeter mating with the second perimeter via a compressible seal to form a sealed cavity therebetween;

a filter disposed in the sealed cavity, the filter substantially encompassed by the compressible seal; and a plurality of yellow-colored spring clamps, each of which is selectively movable between a disengaged position and an engaged position and which absorbs elastic deformation while maintaining coupling of the first generally cube-shaped filter casing and the second generally cube-shaped filter casing, each of the plurality of spring clamp comprising, an attachment portion at a first end of a spring clamp, reversibly attached to a rotational axis on an outer surface of the first generally cube-shaped filter casing, the attachment portion including:

a hook with an inner wall of the hook forming a generally circular space, the generally circular space of a first diameter which is substantially equal to a second diameter of the rotational axis, the hook further including a gap, the gap having a first distance, the first distance less than the first diameter; and a stem which projects straight from the hook and connects the hook to the spring clamp;

a head piece at a second end, the second end opposing the first end, the head piece having a rounded edge which contacts the second flange in the engaged position and does not contact the second flange in the disengaged position, the rounded edge being slidable over the second flange, the head piece having a first material thickness;

a lever located on the head piece and configured to be operated on by a user by applying a force in a first direction to move each of the plurality of spring clamps into the engaged position, the first direction being toward the second flange, the lever further configured to be operated on by a user applying a force in a second direction to move each of the pair of spring clamps into the disengaged position, the second direction opposing the first direction; and an arm, the arm including a continuously curving arc from the attachment portion to the head piece, the continuously curving arc having a first curvature in the disengaged position and a second curvature in the engaged position, the first curvature being greater that the second curvature, the arm having a second material thickness, the first material thickness approximately two times the second material thickness.

21. The air filtration system of claim 1, wherein the spring clamp traverses the first filter casing and the second filter casing, the spring clamp engaging at a first end to a rotational axis on a mounting feature, the mounting feature attached to a wall of the first filter casing and the spring clamp engaging at a second end, through the head piece, to the second flange of the second filter casing.

22. The air filtration system of claim 2, wherein the head piece of the spring clamp abuts against a flat surface of the second flange, the surface of the second flange extending outward from walls of the second filter casing and being perpendicular relative the walls of the second filter casing.

* * * * *